US008665281B2

(12) United States Patent
Khan (10) Patent No.: US 8,665,281 B2
(45) Date of Patent: Mar. 4, 2014

(54) BUFFER MANAGEMENT FOR REAL-TIME STREAMING

(75) Inventor: Humayun Mukhtar Khan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 975 days.

(21) Appl. No.: 12/027,271

(22) Filed: Feb. 7, 2008

(65) Prior Publication Data

US 2009/0204790 A1 Aug. 13, 2009

(51) Int. Cl.
*G09G 5/39* (2006.01)

(52) U.S. Cl.
USPC ........... 345/532; 345/530; 345/531; 345/539; 345/547

(58) Field of Classification Search
USPC .................. 345/545–547; 348/14.01–14.16; 370/229–234
See application file for complete search history.

(56) References Cited

U.S. PATENT DOCUMENTS

| | | | | |
|---|---|---|---|---|
| 5,038,209 | A * | 8/1991 | Hang ...................... | 375/240.05 |
| 5,404,446 | A * | 4/1995 | Bowater et al. ............... | 345/537 |
| 6,356,309 | B1 * | 3/2002 | Masaki et al. ............. | 348/439.1 |
| 6,665,872 | B1 * | 12/2003 | Krishnamurthy et al. ...... | 725/95 |
| 6,741,648 | B2 * | 5/2004 | Karczewicz et al. .... | 375/240.02 |
| 6,982,956 | B2 | 1/2006 | Blanc et al. | |
| 6,990,529 | B2 | 1/2006 | Yang et al. | |
| 7,072,294 | B2 | 7/2006 | Kasper et al. | |
| 7,133,362 | B2 | 11/2006 | Chu et al. | |
| 7,706,384 | B2 * | 4/2010 | van Beek ................... | 370/395.4 |
| 2002/0114393 | A1 | 8/2002 | Vleeschouwer | |
| 2004/0125816 | A1 | 7/2004 | Xu et al. | |
| 2006/0153217 | A1 * | 7/2006 | Chu et al. ...................... | 370/412 |
| 2006/0256861 | A1 * | 11/2006 | Laksono et al. ......... | 375/240.03 |
| 2007/0154065 | A1 | 7/2007 | Kellerer et al. | |
| 2007/0171928 | A1 | 7/2007 | Kim et al. | |
| 2007/0230581 | A1 | 10/2007 | Orr | |
| 2010/0195713 | A1 * | 8/2010 | Coulombe et al. ....... | 375/240.02 |

OTHER PUBLICATIONS

Ascenso et al "Improving Frame Interpolation with Spatial Motion Smoothing for Pixel Domain Distributed Video Coding" Jul. 2005, 5th EURASIP Conference on Speech and Image Processing, Multimedia Communications and Services, Smolenice, Slovak Republic.*

(Continued)

*Primary Examiner* — Ulka Chauhan
*Assistant Examiner* — Robert Bader
(74) *Attorney, Agent, or Firm* — Sonia Cooper; Peter Taylor; Micky Minhas (57) ABSTRACT

Technologies are described herein for buffer management during real-time streaming. A video frame buffer stores video frames generated by a real-time streaming video capture device. New video frames received from the video capture device are stored in the video frame buffer prior to processing by a video processing pipeline that processes frames stored in the video frame buffer. A buffer manager determines whether a new video frame has been received from the video capture device and stored in the video frame buffer. When the buffer manager determines that a new video frame has arrived at the video frame buffer, it then determines whether the video processing pipeline has an unprocessed video frame. If the video processing pipeline has an unprocessed video frame, the buffer manager discards the new video frame stored in the video frame buffer or performs other processing on the new video frame.

18 Claims, 4 Drawing Sheets

(56) References Cited

OTHER PUBLICATIONS

J. Ribas-Corbera, P. A. Chou, S. L. Regunathan, "A Generalized Hypothetical Reference Decoder for H.264/AVC", Jul. 2003, IEEE, IEEE Transactions on Circuits and Systems for Video Technology, vol. 13, No. 7.*

Andrew S. Tanenbaum, "Modern Operating Systems: Second Edition", 2001, Prentice-Hall, Inc., pp. 1-3, 57-58, 95, 150-151, 196, and 261.*

Mark S. Madsen, Iain S. Fogg, Clive L.N. Ruggles, "Meta-Information Systems: A Design Study", Sep. 1994, Australian Journal of Information Systems, vol. 2, No. 1, pp. 39-51.*

Orlov, et al., "Enhancement of Video Streaming QoS with Active Buffer Management in Wireless Environments", Proceedings of the 13th European Wireless 2007 (EW 2007), Paris, 2007, pp. 7.

Johansson, et al., "On the State of the Art in Controlled Bandwidth Sharing", 2004, pp. 149.

Iannaccone, et al., Aggregate Traffic Performance with Active Queue Management and Drop from Tail, pp. 10, (2001).

Balan, et al, "Integrated Buffer Management and Congestion Control for Video Streaming", pp. 6, (2002).

Iannaccone et al., "Aggregate Traffic Performance with Active Queue Management and Drop from Tail," 2001, *ACM SIGCOMM Computer Communication Review*, 31(3): 4-13.

Balan et al., "Integrated Buffer Management and Congestion Control for Video Streaming," Sep. 2003, *Proc. Of the 10$^{th}$ IEEE International Conference on Image Processing*, Barcelona, Spain, 6 pages.

* cited by examiner

BUFFER MANAGEMENT FOR REAL-TIME STREAMING

BACKGROUND

As local area networks and high-speed connections to the Internet have become more pervasive, a greater number of computer users are utilizing the Internet and other networks for real-time streaming of multimedia. Streaming refers to the process of continually transmitting media to an endpoint, where it is typically displayed or otherwise provided to a user. Real-time streaming refers to the process of streaming media that is generated in real-time. For instance, a computer with a video capture device, such as a World Wide Web ("web") camera ("webcam"), connected thereto can be utilized to stream audiovisual media to one or more other computers over a network in real-time.

In most real-time video streaming systems, it is necessary to perform some processing on the video frames before the frames are transmitted to a recipient. For instance, video frames may be compressed prior to transmission to reduce the amount of data transmitted. A video frame buffer is typically utilized to store the video frames prior to and/or during processing.

In most computer systems the amount of memory available to the video frame buffer is limited. As a result, the video frame buffer can quickly become full and, consequently, new frames arriving to the video frame buffer from a video capture device must be discarded, or "dropped." Dropping consecutive video frames can cause significant degradation in video quality for a real-time video streaming application like video conferencing.

Some previous real-time video streaming solutions avoid dropping consecutive video frames by buffering a larger number of video frames. This solution, however, adds latency to the streaming transmission. Latency refers to the time between when a video frame is generated and the time it is displayed at the receiving computer. While additional latency can be acceptable during non real-time playback of a video stream, it is generally unacceptable during real-time video streaming.

It is with respect to these considerations and others that the disclosure made herein is presented.

SUMMARY

Technologies are described herein for buffer management during real-time streaming. Through the concepts and technologies presented herein, a buffer utilized to store video frames during real-time streaming is managed in a manner that reduces the need to drop consecutive video frames. The technologies provided herein also manage the video buffer in a manner that reduces the latency caused by storing large numbers of video frames in the video buffer.

According to one aspect presented herein, a video frame buffer is maintained for storing video frames generated by a real-time streaming video capture device. New video frames received from the video capture device are stored in the video frame buffer prior to processing by a video processing pipeline. The video processing pipeline processes frames stored in the video frame buffer. For instance, the video processing pipeline may retrieve video frames stored in the video frame buffer and compress the frames prior to transmission to a destination. When the video processing pipeline completes the processing of a video frame, it retrieves another frame from the video buffer for processing.

According to other aspects, a buffer manager is executed to manage the contents of the video frame buffer. In one embodiment, the buffer manager is configured to determine whether a new video frame has been received from the video capture device and stored in the video frame buffer. When the buffer manager determines that a new video frame has arrived at the video frame buffer, it then determines whether the video processing pipeline has an unprocessed video frame. If the video processing pipeline has an unprocessed video frame, the buffer manager processes the new video frame stored in the video frame buffer. For instance, in one embodiment the buffer manager discards the new video frame stored in the video frame buffer. In another embodiment, the buffer manager averages the new video frame with a subsequently received video frame and stores the result in the video frame buffer. Latency is reduced and buffer utilization is minimized by dropping video frames that arrive while the video processing pipeline is processing previously received video frames.

According to embodiments, the buffer manager determines whether the video processing pipeline contains an unprocessed video frame by querying the video processing pipeline. In other embodiments, this determination is made by checking an input/output ("I/O") control command to and from the video processing pipeline. The video processing pipeline may be executed within a kernel of an operating system or within a multimedia framework.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Technologies are described herein for buffer management during real-time streaming. Through the embodiments presented herein, a buffer utilized to store video frames during real-time streaming is managed in a manner that reduces the dropping of consecutive video frames and reduces the latency caused by storing large numbers of video frames in the video buffer.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for buffer management during real-time streaming will be described.

Figure 1:
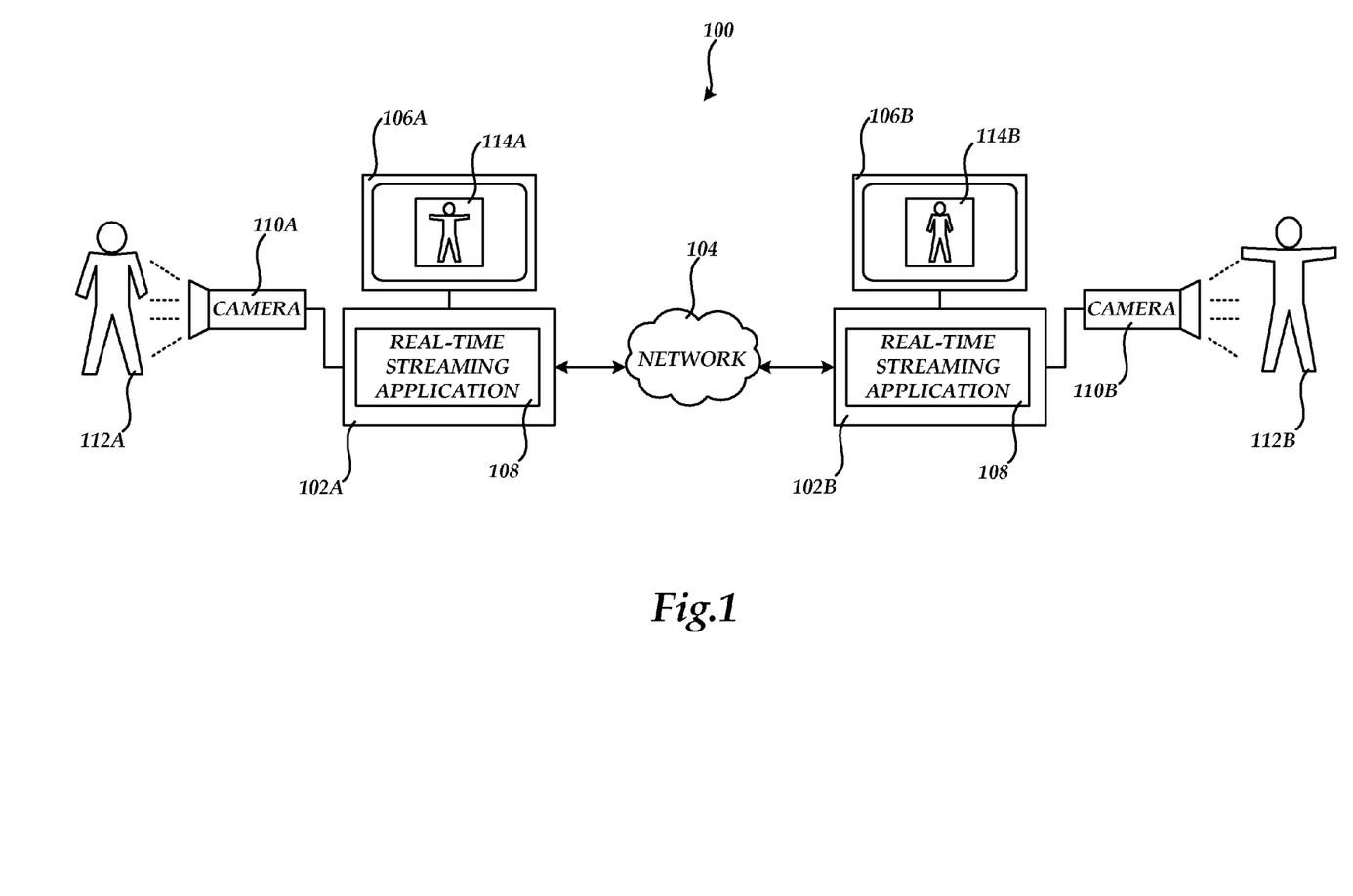
FIG. 1 is a system diagram showing aspects of an illustrative operating environment and several software components provided by the embodiments presented herein.

Turning now to FIG. 1, details will be provided regarding an illustrative operating environment and several software components provided by the embodiments presented herein. In particular, FIG. 1 shows aspects of a real-time video streaming system 100. The real-time video streaming system 100 includes two computers 102A-102B, both of which are configured for streaming audio/visual media over the network 104 in real-time. As discussed above, streaming refers to the process of continually transmitting media to an endpoint, where it is typically displayed or otherwise provided to a user. Real-time streaming refers to the process of streaming media that is generated in real-time.

According to one embodiment, each of the computers 102A-102B is configured to execute a real-time streaming application 108. The real-time streaming application 108 is configured to receive video frames from a real-time streaming video capture device, such as the web cameras 110A-110B. The video frames may also include audio data received, for instance, from microphones integrated with the web cameras 110A-110B. The real-time streaming video capture device may be integrated with or external to the computers 102A-102B.

The real-time streaming application 108 is also configured to cause the video frames received from the web cameras 110A-110B to be processed and to transmit the processed video frames in real-time to a destination. For instance, the real-time streaming application 108 executing on the computer 102A receives video frames in real time from the web camera 110A. In the example shown in FIG. 1, the video frames comprise images of a person 112A and, potentially, audio generated by the person 112A such as a speaking voice.

In response to receiving the video frames, the real-time streaming application 108 executing on the computer 102A causes the frames to be processed and transmits the processed video frames over the network 104 to the computer 102B in real-time. The real-time streaming application 108 executing on the computer 102B receives the video frames, processes the video frames, and displays the video frames on a display 106B. In the example shown in FIG. 1, this process causes the computer 102B to display a real-time image 114B of the person 112A on the display 106B. The computer 102B may also play back any audio transmitted by the computer 102A in synchronization with the play back of the received video frames.

In a similar fashion, the computer 102B may stream video frames to the computer 102A. In particular, the real-time streaming application 108 executing on the computer 102B receives video frames in real time from the camera 110B. The video frames may comprise images of the person 112B and audio. In response to receiving the video frames, the real-time streaming application 108 executing on the computer 102B processes the frames and transmits the processed video frames over the network 104 to the computer 102A.

The real-time streaming application 108 executing on the computer 102A receives the video frames, processes the video frames, and displays the video frames on a display 106A. In the example shown in FIG. 1, this process causes the computer 102A to display a real-time multimedia image 114A of the person 112B on the display 106A. The computer 102A may also play back any audio transmitted by the computer 102B with the video frames.

It should be appreciated that while the real-time video streaming system 100 illustrated in FIG. 1 includes two computers 102A-102B, both of which have been equipped with a video capture device, in an embodiment only one of the computers 102A-102B has a video capture device. In this embodiment, the real-time streaming of video frames is "one-way" from the computer 102A-102B equipped with the capture device to the computer 102A-102B that is not equipped with a capture device. For instance, if the computer 102A is equipped with the camera 110A, but the computer 102B does not have a camera installed, video frames can only be streamed from the computer 102A to the computer 102B. No streaming of video frames can occur from the computer 102B to the computer 102A.

Figure 2:
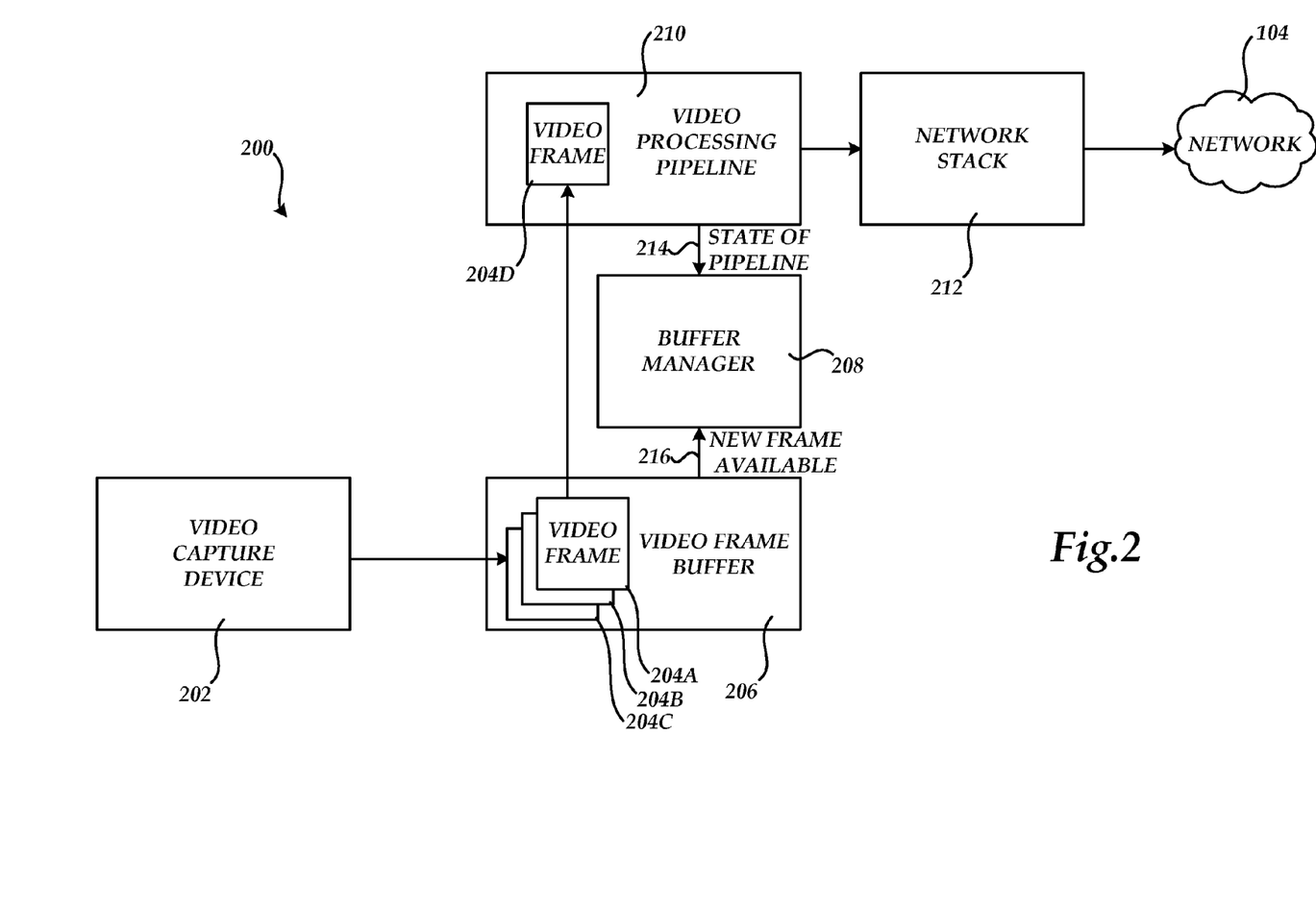
FIG. 2 is a software architecture diagram illustrating aspects of the various software components presented herein in embodiments.

Referring now to FIG. 2, a software architecture diagram illustrating aspects of the various software components presented herein in embodiments will be described. In particular, FIG. 2 illustrates a software architecture 200 utilized by the computers 102A-102B to manage the real-time streaming of video frames. As shown in FIG. 2, the software architecture 200 includes a buffer manager 208, a video frame buffer 206, and a video processing pipeline 210. As discussed briefly above, a real-time streaming video capture device 202, such as the web cameras 110A-110B, generates the video frames 204A-204C and causes the video frames 204A-204C to be placed into the video frame buffer 206.

The video processing pipeline 210 retrieves video frames from the video frame buffer 206 and performs processing on the video frames 204A-204C prior to transmission. For instance, the video processing pipeline 210 may compress the video frames 204A-204C prior to transmission. Other types of processing may also be performed. When the video processing pipeline 210 has completed the processing of a video frame, such as the video frame 204D, it causes a network stack 212 to transmit the processed video frame to its destination over the network 104. The video processing pipeline 210 then retrieves a new video frame from the video frame buffer 206 for processing and repeats this process.

According to embodiments presented herein, the video processing pipeline 210 may be executed within a kernel of an operating system. This implementation is utilized, for instance, when the LINUX operating system is utilized. In another embodiment, the video processing pipeline 210 is executed within a multimedia framework, such as the DIRECTSHOW multimedia framework and application programming interface ("API") from MICROSOFT CORPORATION.

According to embodiments presented herein, the buffer manager 208 is configured to manage the contents of the video frame buffer 206 to optimize the operation of the real-time streaming of video frames. For instance, according to one embodiment, the buffer manager 208 is configured to determine when a new video frame has been placed in the video frame buffer 206. For instance, a signal 216 provided by the video frame buffer 206 may be utilized to notify the buffer manager 208 that a new video frame has been placed in the video frame buffer 206.

When the buffer manager 208 determines that a new video frame has been placed in the video frame buffer 206, the buffer manager 208 then determines whether the video processing pipeline 210 has an unprocessed video frame. An unprocessed video frame is a video frame for which the video processing pipeline 210 has begun but not yet completed processing. This will occur, for instance, when the video processing pipeline 210 is actively processing a video frame 204D.

In one embodiment, the buffer manager 208 utilizes a signal 214 to communicate with the video processing pipeline 210 and to determine whether the video processing pipeline 210 is processing a video frame. In one implementation, the signal 214 is utilized to query the video processing pipeline 210 to determine whether the video processing pipeline 210 contains an unprocessed video frame. In another implementation, the signal 214 is utilized to check an I/O control command to and from the video processing pipeline 210 to determine whether the video processing pipeline 210 contains an unprocessed video frame. Other mechanisms may also be utilized to communicate with the video processing pipeline 210.

If the buffer manager 208 determines that a new video frame has arrived at the video frame buffer 206 and that the video processing pipeline 210 has an unprocessed video frame, the buffer manager 208 is configured to perform processing on the new video frame stored in the video frame buffer 206. In one embodiment, the buffer manager 208 discards the new video frame stored in the video frame buffer 206. In another embodiment, the buffer manager 208 averages the new video frame with a subsequently received video frame and stores the result in the video frame buffer 206. Latency is reduced and buffer utilization is minimized by dropping video frames that arrive while the video processing pipeline 210 is processing previously received video frames. Additional details regarding this process are provided below with respect to FIG. 3.

Figure 3A:
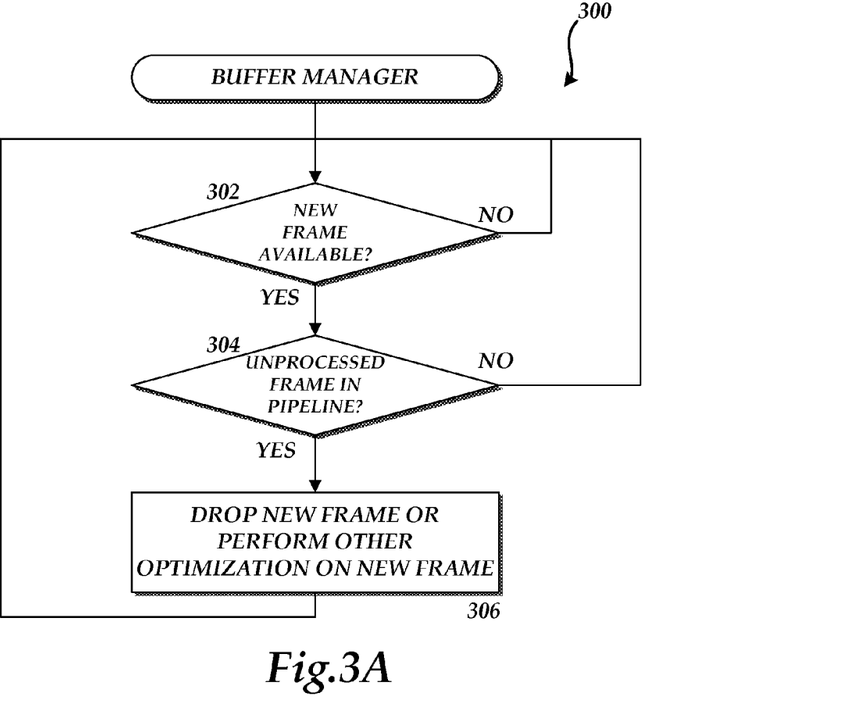
FIGS. 3A-3B are flow diagrams showing illustrative routines for buffer management in a real-time streaming system provided herein in one embodiment.

Referring now to FIG. 3A, additional details will be provided regarding the embodiments presented herein for buffer management during real-time streaming. In particular, FIG. 3A is a flow diagram showing an illustrative routine 300 that illustrates the operation of the buffer manager 208 in one embodiment provided herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the buffer manager 208 determines whether the video frame buffer 206 has a new video frame stored therein. If the video frame buffer 206 does not have a new video frame, the routine 300 returns to operation 302, where another such determination is made. If the video frame buffer 206 has a new video frame, the routine 300 proceeds to operation 304.

At operation 304, the buffer manager 208 determines whether the video processing pipeline 210 has an unprocessed video frame in the manner described above. If the video processing pipeline 210 does not have an unprocessed video frame, the buffer manager 208 takes no action with respect to the new video frame in the video frame buffer 206 and the routine 300 returns to operation 304, described above.

If, at operation 304, the buffer manager 208 determines that the video processing pipeline 210 does have an unprocessed video frame, the routine 300 proceeds from operation 304 to operation 306. At operation 306, the buffer manager 208 processes the new video frame stored in the video frame buffer 206. As discussed above, in one embodiment the buffer manager 208 discards the new video frame stored in the video frame buffer 206. In another embodiment, the buffer manager 208 averages the new video frame with a subsequently received video frame and stores the result in the video frame buffer 206. Other types of processing may also be performed in other embodiments. From operation 306, the routine 300 returns to operation 302 in order to process additional video frames in the manner described above.

Figure 3B:
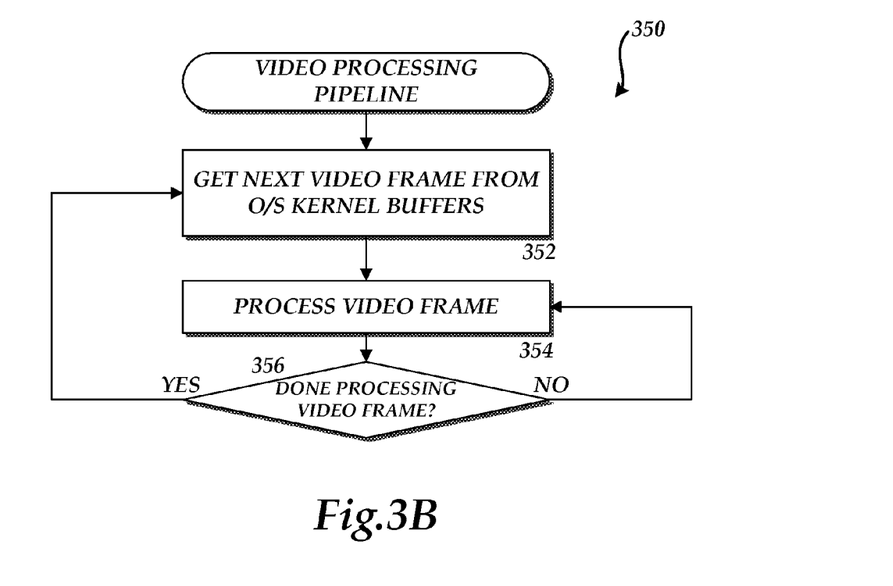

FIG. 3B is a flow diagram showing an illustrative routine 350 that illustrates the operation of the video processing pipeline 210 in one embodiment provided herein. The routine 350 begins at operation 352, where the video processing pipeline 210 retrieves a video frame from the video frame buffer 206. The routine 350 then continues to operation 354, where the video processing pipeline 210 processes the video frame in the manner described above.

At operation 356, a determination is made as to whether the video processing pipeline 210 has completed the processing of the video frame. If not, the routine 350 returns to operation 354 where the video processing pipeline 210 continues to process the video frame. If the processing of the video frame has completed, the routine 350 returns to operation 352, where the video processing pipeline 210 retrieves the next video frame from the video frame buffer 206 for processing. In this manner, the video processing pipeline 210 continually retrieves available video frames from the video frame buffer 206 and processes the available frames.

Figure 4:
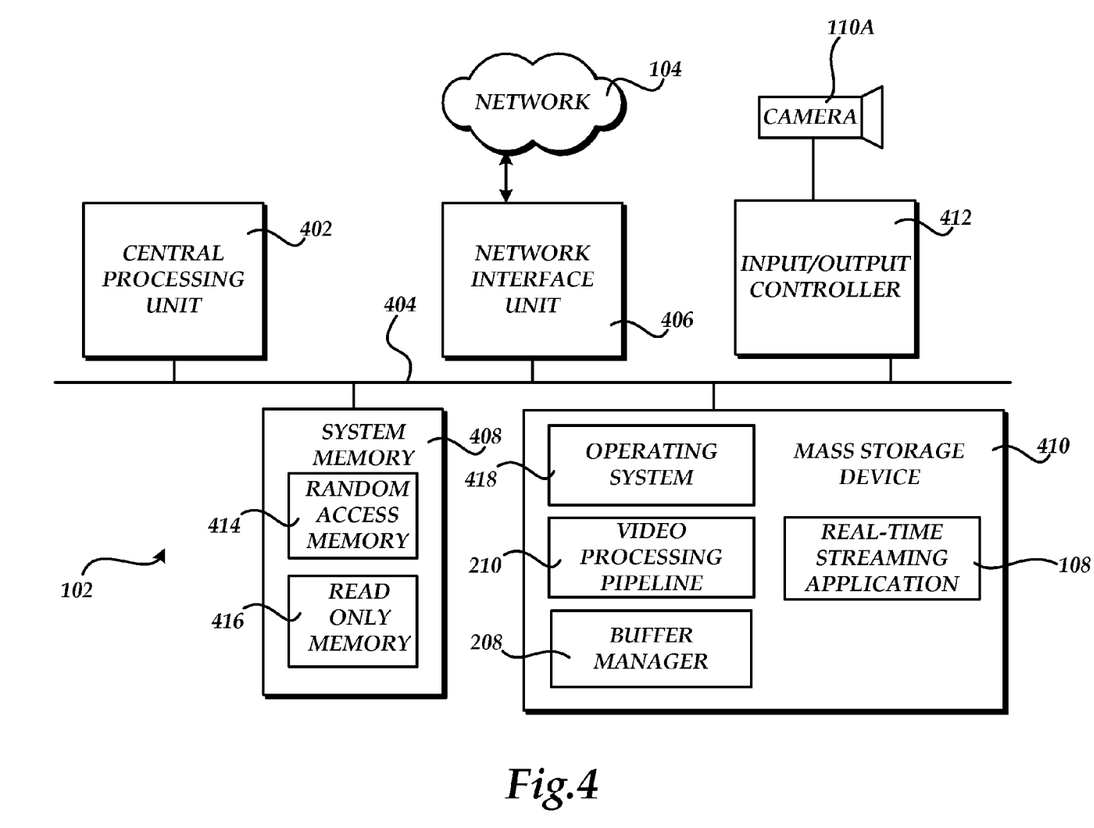
FIG. 4 is a computer architecture diagram showing an illustrative computer hardware and software architecture for a computing system capable of implementing aspects of the embodiments presented herein.

FIG. 4 shows an illustrative computer architecture for a client computer 102 capable of executing the software components described herein for buffer management during real-time streaming in the manner presented above. The computer architecture shown in FIG. 4 illustrates a conventional desktop, laptop, or server computer and may be utilized to execute any aspects of the software components presented herein.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 102, such as during startup, is stored in the ROM 416. The computer 102 further includes a mass storage device 410 for storing an operating system 418, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the computer 102. Although the description of computer-readable media contained herein refers to a mass storage device, such as a hard disk or CD-ROM drive, it should be appreciated by those skilled in the art that computer-readable media can be any available computer storage media that can be accessed by the computer 102.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 102.

According to various embodiments, the computer 102 may operate in a networked environment using logical connections to remote computers through a network such as the network 104. The computer 102 may connect to the network 104 through a network interface unit 406 connected to the bus 404. It should be appreciated that the network interface unit 406 may also be utilized to connect to other types of networks and remote computer systems. The computer 102 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4). The input/output controller 412 may also be utilized to receive video frames from a real time video capture device such as the camera 110A.

As mentioned briefly above, a number of program modules and data files may be stored in the mass storage device 410 and RAM 414 of the computer 102, including an operating system 418 suitable for controlling the operation of a networked desktop, laptop, or server computer. The mass storage device 410 and RAM 414 may also store one or more program modules. In particular, the mass storage device 410 and the RAM 414 may store the real-time streaming application 108, the video processing pipeline 210, and the buffer manager 208, each of which was described in detail above with respect to FIGS. 1-3B. The mass storage device 410 and the RAM 414 may also store other types of program modules.

Based on the foregoing, it should be appreciated that technologies for buffer management during real-time streaming are provided herein. It should be appreciated that although the embodiments presented herein have been described in the context of a real-time video streaming system, the concepts presented herein may also be utilized with a real-time audio streaming system. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for managing contents of a buffer in a real-time video streaming system, the method comprising:
   determining whether a new video frame has arrived at the buffer;
   in response to determining that a new video frame has arrived at the buffer, querying a video processing pipeline to determine whether the video processing pipeline contains an unprocessed video frame; and
   discarding the new video frame in response to determining that the video processing pipeline contains an unprocessed video frame.

2. The method of claim 1, wherein the new video frame comprises a video frame generated by a real-time streaming video capture device.

3. The method of claim 2, wherein determining whether the video processing pipeline contains an unprocessed video frame comprises checking an input/output control command to and from the video processing pipeline to determine whether the video processing pipeline contains an unprocessed video frame.

4. The method of claim 2, wherein the video processing pipeline is executed within a kernel of an operating system.

5. The method of claim 2, wherein the video processing pipeline is executed within a multimedia framework.

6. A computer storage medium that is not a signal, the computer storage medium having computer executable instructions stored thereon which, when executed by a computer, cause the computer to:
   maintain a buffer for buffering video frames;
   execute a video processing pipeline for processing the video frames; and to
   execute a buffer manager, the buffer manager being configured to determine whether a new video frame has arrived at the buffer, to query the video processing pipeline to determine if the video processing pipeline has an unprocessed video frame in response to determining that a new video frame has arrived at the buffer, and to discard the new video frame in response to determining that the video processing pipeline has an unprocessed video frame.

7. The computer storage medium of claim 6, wherein the video processing pipeline is configured to retrieve video frames from the buffer for processing.

8. The computer storage medium of claim 7, wherein the video frames comprise video frames generated by a real-time streaming video capture device.

9. The computer storage medium of claim 8, wherein the video processing pipeline is executed within a kernel of an operating system executing on the computer.

10. The computer storage medium of claim 8, wherein the video processing pipeline is executed within a multimedia framework executing on the computer.

11. The computer storage medium of claim 8, wherein determining if the video processing pipeline has an unprocessed video frame comprises checking an input/output control command to and from the video processing pipeline to determine whether the video processing pipeline contains an unprocessed video frame.

12. A method for managing contents of a video frame buffer in a real-time video streaming system, the method comprising:

maintaining the video frame buffer for storing video frames generated by a video capture device;

executing a video processing pipeline for processing video frames stored in the video frame buffer;

determining, by a buffer manager, whether a new video frame has arrived at the video frame buffer;

querying, by the buffer manager, the video processing pipeline whether the video processing pipeline has an unprocessed video frame in response to finding that the new video frame has arrived at the video frame buffer; and in response to determining that the video processing pipeline has an unprocessed video frame, performing processing on the new video frame stored in the video frame buffer, the processing comprising discarding the new video frame or averaging the new video frame with a next new video frame stored in the video frame buffer.

13. The method of claim 12, wherein the video capture device comprises a real-time streaming video capture device.

14. The method of claim 13, wherein the video processing pipeline is executed within a kernel of an operating system or within a multimedia framework.

15. The method of claim 14, wherein determining whether the video processing pipeline has an unprocessed video frame comprises checking an input/output control command to and from the video processing pipeline to determine whether the video processing pipeline contains an unprocessed video frame.

16. The method of claim 4, wherein the buffer is executed within the kernel of the operating system.

17. The computer storage medium of claim 9, wherein the buffer is executed within the kernel of the operating system executing on the computer.

18. The method of claim 14, wherein the video frame buffer is executed within the kernel of the operating system.

* * * * *